United States Patent Office 2,942,949
Patented June 28, 1960

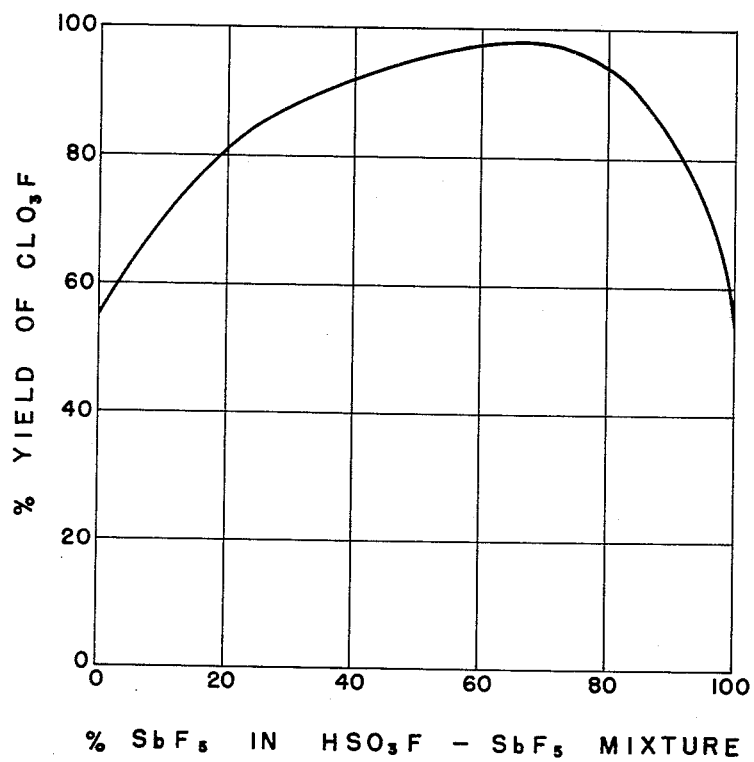

2,942,949
PROCESS FOR THE PREPARATION OF PERCHLORYL FLUORIDE

Gerhard Barth-Wehrenalp, Elkins Park, and Harry Creston Mandell, Jr., Abington, Pa., assignors to Pennsalt Chemicals Corporation, Philadelphia, Pa., a corporation of Pennsylvania Filed Nov. 7, 1957, Ser. No. 695,034

8 Claims. (Cl. 23—203)

This invention relates to perchloryl fluoride, $ClO_3F$. More particularly it pertains to an improved method for the preparation of $ClO_3F$ by reaction of an inorganic perchlorate with a novel fluorinating agent mixture.

Perchloryl fluoride may be prepared by reacting an inorganic perchlorate with fluosulfonic acid, with a demonstrated yield of 73% based on potassium perchlorate consumed, as described in copending application Serial No. 554,622, filed December 22, 1955, by William A. La Lande, Jr.

Perchloryl fluoride may also be prepared by reacting an inorganic perchlorate with antimony pentafluoride, with a demonstrated yield of 53% based on potassium perchlorate consumed, as described in copending application Serial No. 626,319, filed by Alfred E. Engelbrecht.

We have now found that the yield of perchloryl fluoride produced based on the weight of perchlorate consumed according to reactions

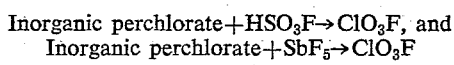

is unexpectedly synergistically increased to as much as about 97% by using a fluorinating agent comprising a mixture of fluosulfonic acid and antimony pentafluoride according to the reaction.

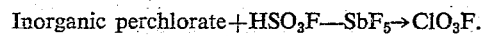

The unexpected synergistic effect upon the yield of perchloryl fluoride of the mixing of antimony fluoride with fluosulfonic acid and use of the mixture as the fluorinating agent is shown in the accompanying drawing. The chart in the drawing, which represents an embodiment of a series of experiments which were run under substantially the same controlled conditions, shows that the yield of perchloryl fluoride rapidly increases as the amount of antimony pentafluoride in the fluosulfonic acid-antimony pentafluoride fluorinating agent increases, up to a yield of about 97% at an antimony pentafluoride content of 60% by weight of the fluorinating agent mixture.

We have further found unexpectedly that the formation of by-product chlorine and oxygen gases, which occurs in the production of perchloryl fluoride when fluosulfonic acid alone or antimony pentafluoride alone is used as the fluorinating agent, is substantially decreased when our synergistic fluosulfonic acid-antimony pentafluoride fluorinating agent mixture is used. This desirable result is obtained even when only a small proportion of one of the components is present in the fluorinating agent mixture. The substantial elimination of the chlorine and oxygen byproduct gases significantly facilitates the recovery of perchloryl fluoride and its purification.

According to the method of our invention, perchloryl fluoride initially and substantially free of byproduct gases is prepared by contacting an inorganic perchlorate and a fluosulfonic acid-antimony pentafluoride fluorinating agent mixture at a temperature in the range from about 20° C. to about the boiling point of the reaction mass until reaction therebetween substantially occurs to form perchloryl fluoride, and recovering said fluoride from the reaction mass by customary separation means.

In a preferred embodiment of our invention, 10 parts of potassium perchlorate are dissolved in about 40 parts of fluosulfonic acid and the solution is fed continuously, simultaneously with an amount of antimony fluoride equivalent to 1½ times the input weight of fluosulfonic acid, into a vertical packed tower type reactor where the solution is reacted at a temperature of from about 100° C. to 135° C. for from about 1 to 10 minutes, the shorter time being used at the higher temperature. Preferred reaction conditions are a temperature of about 105° C. to 110° C. and a reaction time of about 5 minutes. Perchloryl fluoride gas begins to form immediately and is removed continuously from the system. At about the end of the reaction period, as evidenced by evolution of only traces of $ClO_3F$ from samples of the residual mass at the lower end of the reactor, the residual reaction mass is continuously withdrawn from the reactor system. In practice, the reaction is carried out in a reactor vessel into which the reactants flow continuously, and the perchloryl fluoride leaves as a gaseous overhead product, while the liquid residual reaction mass containing the spent fluorinating agent mixture and other byproduct compounds passes out at the bottom of the vessel at the end of the prescribed retention period.

The perchloryl fluoride leaving the system is substantially free of the gaseous chlorine and oxygen byproducts which may normally be present in the gas stream of the product when the process of our invention is not used. The perchloryl fluoride is recovered and purified by gas-washing methods described in the prior art, see for example the copending applications cited above.

The fluosulfonic acid used in the practice of our invention is commercially available. The technical grade of fluosulfonic acid containing about 98% $HFSO_3$ has been found satisfactory for use and is preferred.

The antimony pentafluoride used in the practice of this invention is commercially available, or may be prepared by treating antimony trifluoride or oxide with fluorine; it may also be obtained by reacting antimony pentachloride with anhydrous hydrogen fluoride. The technical grade of antimony pentafluoride, containing less than 100% $SbF_5$, has been found satisfactory for use and is preferred.

The perchlorates used in carrying out our novel process are inorganic perchlorates. The perchlorate preferably used is potassium perchlorate. Sodium and magnesium perchlorates and perchloric acid have also been used with good results. Other perchlorates also can be used to carry out the invention. These include the perchlorates of barium, calcium, lithium, and silver and nitrosyl perchlorate. The term "inorganic perchlorate" used in certain of the claims is intended to include perchloric acid. Relative costs and availabilities favor the use of the potassium and sodium salts. Technical grade perchlorate has been found to work as well as material of higher purity. A low chlorate content is desirable in the perchlorate in order to minimize formation of undesirable by-products.

Fluosulfonic acid may be mixed in any proportion with antimony pentafluoride in preparing and using the novel fluorinating agent mixture of our invention for the preparation of perchloryl fluoride. Thus from 1 to 99 parts by weight of fluosulfonic acid can be mixed with from 99 to 1 part by weight of antimony pentafluoride and advantageously used in our process. Since fluosulfonic acid is the less expensive of the two agents in the mixture, it is preferable to use as much fluosulfonic acid as possible to obtain the most economical process. However, where yield is the primary consideration, the ratio of fluosulfonic acid should be adjusted to the optimum, which is 2 parts of fluosulfonic acid to 3 parts of antimony pentafluoride. Yields of perchloryl fluoride of over 80% based on potassium perchlorate can be obtained with a mixture of fluosulfonic acid and antimony pentafluoride, containing from about 20% to 90% by weight of antimony pentafluoride.

Perchlorates and our novel fluosulfonic acid-antimony pentafluoride fluorinating agent mixture can be reacted in most proportions to form some perchloryl fluoride. However, from the standpoint of optimum safety as well as of optimum yield it is preferred to use sufficient excess fluorinating agent mixture to dissolve the perchlorate. For potassium perchlorate this condition exists when the fluorinating agent mixture is present in the ratio of about 6 parts by weight of said mixture to 1 of potassium perchlorate. When more perchlorate is used than can be dissolved in the mixture, vigorous stirring is required to avoid dormant masses of solid perchlorate which might react explosively with byproduct sulfuric acid formed during the reaction. A preferred proportion of reactants is 10 parts by weight of the fluorinating agent mixture to 1 part of inorganic perchlorate.

When a solid perchlorate is used, it is preferably used in the form of small-sized particles which will readily go into solution in the fluorinating agent mixture. Complete solution of the perchlorate is desirable but not necessary. When more than about 1 part by weight of a solid form of perchlorate is used per about 5 parts of fluorinating agent mixture, the solubility limit is exceeded and a suspension of perchlorate crystals in the acid results. Agitation is then necessary to aid solution and to avoid accumulation of large settled masses of perchlorate in the reactor. Mixing is preferably done at room temperatures to carry out the solution step.

In carrying out the reaction between the inorganic perchlorate and our novel fluorinating agent mixture, the preferred temperature range is 70° C. to 130° C. The temperature may be raised to about the boiling point of the antimony pentafluoride, which at atmospheric pressure is about 149.5° C.; however, since by raising the temperature the possibility of undesirable side reactions, resulting in lower yields, is increased, a lower temperature, around 100° C., is preferred. When fluosulfonic acid alone or antimony pentafluoride alone is used as the fluorinating agent, heating is required to begin the reaction with the perchlorate. Surprisingly, when our synergistic fluorinating mixture of fluosulfonic acid and antimony pentafluoride is used, reaction begins almost immediately upon contacting the reactants at room temperature. Therefore, contact of the perchlorate with a mixture of the fluosulfonic acid and antimony pentafluoride should be avoided until release of the perchloryl fluoride gas is actually desired. Either of the fluorinating agents, separately, may, however, be mixed with the perchlorate without any significant reaction occurring at room temperatures. In mixing the reactants in carrying out the process in a continuous operation it is advantageous to dissolve the perchlorate in either the antimony pentafluoride or in the fluosulfonic acid before adding the other fluorinating agent. For example, it is preferred to add the perchlorate to fluosulfonic acid before adding the antimony pentafluoride to the reaction mass.

After the perchlorate has been contacted with our fluorinating agent mixture, heat should be applied gradually to attain an economic reaction rate. Below 70° C. the reaction usually proceeds too slowly for practical purposes.

The invention may be practiced as a batchwise or as a continuous operation. It may be carried out in conventional type vessels, for example, common acid-resistant kettle reactors. The reactor vessel may be used in combination with continuous feeders for the ingredients and with a continuous distillation unit for recovery of unreacted fluorinating agent.

The time required to carry out the reaction between the perchlorate and our novel fluorinating agent mixture is dependent not only on the temperature at which the operation is carried out, but also on the ratio of antimony pentafluoride to fluosulfonic acid in the fluorinating agent mixture. The reaction rate increases to a maximum as the optimum ratio of antimony pentafluoride to fluosulfonic acid of 3 to 2 is approached. In a conventional batch-type reactor the reaction can be completed within reaction periods ranging from about 2 to 24 hours. The practical rate in each case is influenced by the ability of the equipment used to remove and recover the evolved $ClO_3F$. A period of 4 hours is preferred for a batch-type reaction using a charge of 1 part by weight of perchlorate to about 10 parts of the fluorinating agent mixture at 85° C. When a continuous operation is used, higher temperatures are preferably used and the reaction takes place much more rapidly, as disclosed above.

The invention and its practice are further illustrated by the following examples, in which the parts are by weight unless otherwise stated.

Example 1

This example demonstrates the yield or $ClO_3F$ obtained when an inorganic perchlorate is reacted with antimony pentafluoride alone.

10 parts of antimony pentafluoride were placed in a glass reactor. 1 part of crystalline potassium perchlorate was added gradually to the antimony pentafluoride with moderate agitation. The reactor was equipped with a thermometer well extending into the reaction mixture, a nitrogen purging inlet, a mechanical stirrer, and a water-cooled reflux condenser. A take-off tube was attached to the top of the condenser to lead the effluent gases to a series of four gas-scrubbers each half-filled with an aqueous solution containing about 10% caustic soda and about 5% sodium thiosulfate. The gas inlet to the first scrubber was arranged so that the gases passed over and not into the scrubbing solution in the reactor. The outlet led to the other scrubbers in the series, which were fitted so that the gases passed through the solution in each scrubber. A drying tube containing solid potassium hydroxide led the gases from the last scrubber to a liquid-nitrogen-cooled trap into which the product was condensed. The reactor was heated rapidly at first to 70° C. and then slowly to 150° C. The reaction temperature was held at 100–120° C. by applying heat. The flow of water through the reflux condenser was held so that the temperature of the effluent water from the condenser was around 25° C. Evolution of perchloryl fluoride began to be noticeable at 70° C. and was vigorous at 105° C. Chlorine and oxygen gases were evolved in the temperature range of from 100° C. to 130° C. They were collected with product. The reaction rate was readily controlled by decreasing or increasing the heat to the reactor. The condenser served to reflux antimony pentafluoride back to the reactor. Reaction was complete in about 4 hours. A liquid residue composed mostly of antimony pentafluoride with some complex potassium antimony oxyfluoride salts remained in the reactor. The reactor system was purged with nitrogen gas before dismantling it. The perchloryl fluoride was recovered as a liquid in the liquid-nitrogen-cooled trap along with chlorine and oxygen and was separated from them by distillation. The yield of perchloryl fluoride was 53% based on the amount of potassium perchlorate charged. The perchloryl fluoride boiled at −47.5° C. Its identity was confirmed by infra-red analysis. Its purity was determined by chemical and gas chromatographic analysis to be about 98.5%, the difference from 100 in the analysis being due to the presence of air and carbon dioxide.

Example 2

This example demonstrates the yield of $ClO_3F$ obtained when an inorganic perchlorate is reacted with fluosulfonic acid alone.

10 parts of fluosulfonic acid were reacted with 1 part of potassium perchlorate as in Example 1. Evolution of perchloryl fluoride began at about 60° C. and continued up to about 100° C. Chlorine and oxygen were evolved in the 100° C.–130° C. range. A yield of 55% of $ClO_3F$ was obtained based on the weight of $KClO_4$ charged.

*Example 3*

This example demonstrates the improved yield obtained when an inorganic perchlorate is reacted with our novel fluorinating agent comprising a mixture of fluosulfonic acid and antimony pentafluoride, in accordance with one embodiment of our invention.

The apparatus and general procedure described in Example 1 were used. 5 parts of fluosulfonic acid were mixed with 5 parts of antimony pentafluoride and the mixture was then added to 1 part of potassium perchlorate. Vigorous evolution of perchloryl fluoride began immediately upon mixing the reactants at 25° C.–30° C. After gas evolution subsided the reaction mixture was heated to 130° C., but no further gas evolution occurred. No chlorine or oxygen gases were evolved during the reaction. A 91% yield of perchloryl fluoride was obtained, based on the weight of $KClO_4$ charged.

Following the general procedure used in Examples 1, 2 and 3, potassium perchlorate was reacted with a wide range of mixtures of fluosulfonic acid and antimony pentafluoride as shown in the following examples:

| Example No. | Reactants, Parts by Weight | | | Yield of $ClO_3F$, Percent |
|---|---|---|---|---|
| | $KClO_4$ | $HSO_3F$ | $SbF_5$ | |
| 4 | 10 | 90 | 10 | 68 |
| 5 | 10 | 80 | 20 | 83 |
| 6 | 10 | 70 | 30 | 87.5 |
| 7 | 10 | 60 | 40 | 92 |
| 8 | 10 | 40 | 60 | 97 |
| 9 | 10 | 20 | 80 | 95 |
| 10 | 10 | 10 | 90 | 82.8 |
| 11 | 10 | 1 | 99 | 60.8 |

Further following the general procedure used in the preceding Examples 1–11, barium perchlorate, sodium perchlorate, magnesium perchlorate and perchloric acid were individually reacted with antimony pentafluoride as shown in the following examples:

| Example No. | Reactants, Parts by Weight | | | Yield of $ClO_3F$, Percent |
|---|---|---|---|---|
| | Perchlorate | $HSO_3F$ | $SbF_5$ | |
| 12 | 12.1 parts $Ba(ClO_4)_2$ | 50 | 50 | 82.8 |
| 13 | 8.9 parts $NaClO_4$ | 50 | 50 | 89.1 |
| 14 | 8.05 parts $Mg(ClO_4)_2$ | 50 | 50 | 46.1 |
| 15 | 12.1 parts 60% $HClO_4$ | 50 | 50 | 75.4 |

*Example 16*

10 parts of $KClO_4$ are dissolved in 60 parts of fluosulfonic acid. The solution is fed, and simultaneously mixed with an amount of antimony pentafluoride equivalent to the weight input of fluosulfonic acid, in a fine stream into the top of a vented vertically mounted vessel which is packed with acid resistant packing material and heated in the range of from 105° C. to 110° C. Free space in the packed vessel should be about 40%. Retention time of the solution in the reactor should be about 4½ minutes, representing the time for the liquid to flow from the top of the reactor to the outlet at the bottom. The reaction temperature through the retention period in the reactor is held at about 105° C. Perchloryl fluoride forms as a gas. It is collected from the top of the reactor into a suitable gasholder from which it later may be liquefied.

Following procedures substantially as described in the above examples our novel fluosulfonic acid-antimony pentafluoride fluorinating agent mixture may also be reacted with other inorganic perchlorates, e.g. lithium, calcium, nitrosyl, silver and so on, to produce perchloryl fluoride.

Many widely different embodiments of this invention may be made and many process variables obvious to those skilled in the art may be introduced without departing from the scope and spirit thereof and it is to be understood that our invention includes all such embodiments and is not to be limited by the above description.

We claim:

1. Process for the preparation of perchloryl fluoride which comprises contacting an inorganic perchlorate with a fluorinating agent mixture consisting substantially of fluosulfonic acid and antimony pentafluoride at a temperature in the range from about 20° C. to about the boiling point of the reaction mass until reaction therebetween substantially occurs to form perchloryl fluoride and recovering said fluoride from the reaction mass.

2. The process according to claim 1 wherein the proportion of inorganic perchlorate to the fluorinating agent mixture of fluosulfonic acid and antimony pentafluoride is substantially 1 part by weight of perchlorate to at least 6 parts by weight of said fluorinating agent mixture.

3. The process according to claim 1 wherein said fluorinating agent mixture of fluosulfonic acid and antimony fluoride consists substantially of from 20% to 90% by weight of antimony pentafluoride and 80% to 10% by weight of fluosulfonic acid.

4. The process according to claim 1 wherein said inorganic perchlorate is selected from the group consisting of potassium perchlorate, sodium perchlorate, lithium perchlorate, magnesium perchlorate, barium perchlorate and perchloric acid.

5. In the process according to claim 1 the method which comprises the steps of continuously contacting said inorganic perchlorate with said fluorinating agent mixture of fluosulfonic acid and antimony pentafluoride at a temperature of from about 100° C. to about 135° C. for a reaction period of from about 1 to about 10 minutes; continuously separating gaseous perchloryl fluoride from the reaction mass; and continuously removing the residual reaction mass from the perchloryl fluoride generation vessel at about the end of said reaction period.

6. The process according to claim 1 wherein the proportion of inorganic perchlorate to the fluorinating agent mixture of fluosulfonic acid and antimony pentafluoride is substantially 1 part of perchlorate to about 10 parts by weight of the mixture.

7. The process according to claim 1 wherein said inorganic perchlorate is potassium perchlorate.

8. Process for preparing perchloryl fluoride which comprises contacting an inorganic perchlorate at a temperature of at least 20° C. with a sufficient amount of a fluorinating agent comprising fluosulfonic acid and antimony pentafluoride to form perchloryl fluoride and recovering said perchloryl fluoride from the reaction mass.

References Cited in the file of this patent

Mellor: "Comprehensive Treatise on Inorganic and Theoretical Chemistry," vol. 9, pages 467–468.

Journal of Inorganic and Nuclear Chemistry, April 1956, p. 266.